2,903,452

POLYPYRAZOLONE PIGMENTS

Carl Mayn Smith, White Bear Lake, Minn., assignor to General Aniline & Film Corporation, New York, N.Y., a corporation of Delaware No Drawing. Application December 23, 1957
Serial No. 704,319

14 Claims. (Cl. 260—240)

This invention relates to novel polypyrazolone pigments and to methods for producing same. More particularly, the pigments of the instant invention are compounds devoid of sulfonic and carboxylic acid groups having the formula:

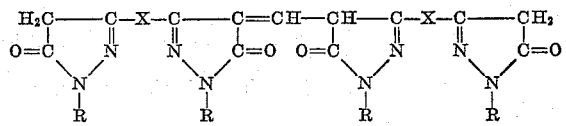

wherein X is selected from the group consisting of phenylene, naphthylene, and biphenylene; and R is selected from the group consisting of H, lower alkyl, aralkyl, and aryl. It has been found that the above-described novel compounds comprise a group of oil and water-insoluble pigments having improved fastness and other properties which render them highly suitable for use in inks, natural and synthetic resins, rubber, paints, lacquers, enamels and other film-forming and coating compositions, in pigmentation of fibers and films by incorporation into the spinning solutions, in paper and in other common pigment applications.

In the above formula, X may be phenylene, such as o-phenylene, m-phenylene, and preferably p-phenylene, naphthylene, such as 1,4-naphthylene and 1,5-naphthylene, 4,4'- and 3,3'-biphenylene, and inert substituted derivatives thereof. R may be H, lower alkyl such as methyl, ethyl, butyl, isobutyl, amyl, isoamyl, and the like, aralkyl such as benzyl, and aryl such as phenyl, 1-naphthyl, 2-naphthyl and biphenyl, and the like and inert substituted derivatives thereof. Examples of inert substituents mentioned above include halo such as chloro and bromo, nitro, alkyl such as methyl and ethyl, phenyl and the like.

The compounds of the above formula may be prepared by reacting two molecular equivalents of a bis-pyrazolone having the formula:

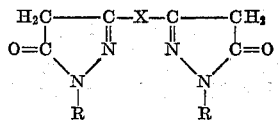

wherein X and R have the values given above, with one molecular equivalent of a methylidyne donor linking agent. The following methods may be employed:

(1) Heating an alkaline solution of the bis-pyrazolone with chloroform.

(2) Heating the bis-pyrazolone with a dialkoxymethyl carboxylate such as diethoxymethyl acetate.

(3) Heating the bis-pyrazolone with an ester of orthoformic acid such as ethylorthoformate, preferably in glacial acetic acid.

(4) Heating the bis-pyrazolone with formamide.

Of these methods, the last two methods are preferred, particularly method #4, in view of the ease and efficiency of operation, availability of materials, and reproducibility of results. In carrying out these reactions, the reactants may be heated at from about 50 to 220° C. for about one-half to eight hours, depending upon the particular method employed, the reactants involved, and the like.

The above mentioned bis-pyrazolones employed as reactants in the above described processes are well known in the art, such compounds and their methods of production being disclosed for example in German Patents 650,558 and 625,813, U.S. 2,013,181, the Berend and Herms article in "Journal für Praktische Chemie" (2), 74, p. 125 etc., and the like. In general, such bis-pyrazolones are made by reaction of one mole of a bis-keto ester of the formula:

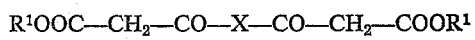

with two moles of a hydrazine of the formula

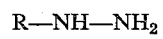

wherein X and R have the values given above and $R^1$ is lower alkyl, such as methyl, ethyl or the like. This reaction to form the bis-pyrazolone is carried out at elevated temperatures and may, if desired, be catalyzed with glacial acetic acid or the like, and, may be carried out in a solvent or diluent such as ethanol, dioxane or the like.

As some specific examples of bis-keto esters which may be employed in making the bis-pyrazolones, there may be mentioned the methyl and ethyl esters of terephthaloyl-bis-acetic, isophthaloyl-bis-acetic, naphthoylene-1,4-bis-acetic, naphthoylene-1,5-bis-acetic, diphenyloyl-4,4'-bis-acetic, diphenyloyl-3,3'-bis-acetic acids and the like.

The above bis-keto esters may in general be prepared by reacting the appropriate aryl diacid chloride of the formula $X(COCl)_2$ with methyl or ethyl acetoacetate in cold aqueous alkali in essentially a Schotten-Baumann type procedure, or by diacetylating the aryl residue X by a Friedel-Crafts reaction and then condensing the resulting diketone (diacetyl derivative) with diethylcarbonate.

As examples of hydrazines which may be employed in making the bis-pyrazolones, there may be mentioned the methyl, ethyl, isobutyl, isoamyl, benzyl, phenyl, p-bromophenyl, biphenyl, o-nitrophenyl, m-nitrophenyl, p-nitrophenyl, picryl, o-tolyl, m-tolyl, p-tolyl, 2,3-xylyl, 1-naphthyl and 2-naphthyl hydrazines and the like.

As is well recognized in the dyestuff and pigment art, improved pigmentary properties are obtained when the initial reactants are as pure as possible. Thus, improved results are obtained when the bis-pyrazolone reactant is first purified, as for example by recrystallization from an organic solvent such as dichlorobenzene, trichlorobenzene or the like.

Still further improved pigmentary properties are obtained when the above described polypyrazolone pigments of the instant invention are further purified by fractional precipitation in sulfuric acid, comprising dissolving the pigment in concentrated sulfuric acid, diluting with small amounts of water to form a precipitate, presumably the sulfate salt, separating the precipitate by filtration and regenerating the pure pigment by slurrying in water. Optimum results are obtained when this treatment is carried out in a closed vessel or with exclusion of atmospheric humidity. The pigments so obtained are of still further improved brightness, strength and lightfastness.

The pigments of the instant invention may be employed as such or prepared for the market in known manner depending upon the intended use thereof. Thus, a representative paste suitable for use in inks, paints and the like may be made by ball-milling the pigment paste obtained as described hereinabove for a number of hours with 50% of Tamol NNO (sodium salt of sulfonated naphthalene formaldehyde condensate) on the weight of the pigment.

In the following examples, parts are by weight unless otherwise indicated, parts by weight are in grams and parts by volume are in cc. These examples are illustrative of the instant invention and are not to be regarded as limitative.

EXAMPLE 1

Preparation of 1,1'-diphenyl-3,3'-(p-phenylene)-5,5'-dipyrazolone

In a large evaporating dish on a steam bath is charged 300 g. diethyl terephthaloyl diacetate (93% purity) and 216 g. phenyl hydrazine. The mixture is stirred thoroughly and the sides of the dish rinsed down to 100–150 cc. with ethanol solvent. Finally, all of the diethyl terephthaloyl diacetate goes into solution which is then deep yellow brown. Then the solution begins to boil vigorously and the solid product starts to separate after about 10 to 15 minutes heating. The mixture becomes thicker and thicker until it sets to a very thick mush. Several portions of ethanol solvent are added (200–300 cc. each) and the mixture mushed up and evaporated down again. It is finally heated on the steam bath for another hour, making a total heating time at about 3 hours. The cooled product is then transferred to a large mortar, and the lumps ground up with ethanol solvent. It is transferred to a funnel, pulled down with suction and then washed with 2 to 3 liters of ethanol solvent, at which time the wash is almost colorless. It is then pulled down and dried in the hot box.

Yield=309 gms.

Theoretical=394 gms.

Percent of theoretical=84% based on the formula for the product (M.W. 394)

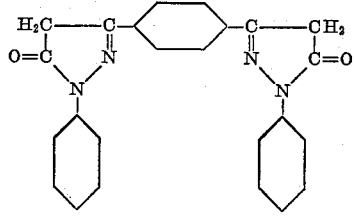

EXAMPLE 2

Preparation of pigment from the bis-pyrazolone of Example 1 by the formamide method In a 3-necked flask, fitted with stirrer and thermometer is charged 10 g. of the bis pyrazolone from Example 1, and 90 cc. formamide. The mixture is heated with stirring to 185° C. during 54 minutes and held at 185–187° C. for 45 minutes. The mixture is then filtered at 120° C., the filter cake washed with warm formamide (ca. 120° C.) and water, and the cake dried.

Yield=9.6 g.

Percent of theoretical=95% based on the formula of the product:

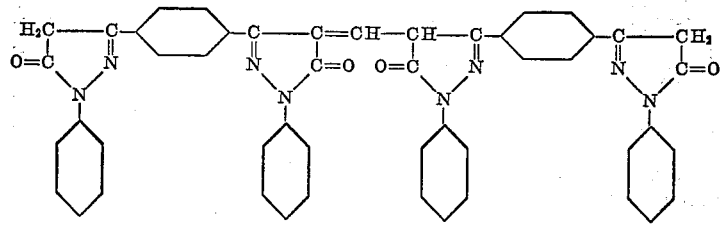

$C_{49}H_{34}O_4N_8$ M.W. 798

The product is an insoluble yellow pigment of good fastness properties.

EXAMPLE 3

Preparation of pigment from the bis pyrazolone of Example 1 by the orthoformate method In a 100 cc. 3-necked flask fitted with thermometer, stirrer and reflux condenser is charged 30 cc. glacial acetic acid, 6.6 g. bis-pyrazolone from Example 1, and 2.8 cc. (2.46 g.) ethyl orthoformate. The mixture is stirred while heating; at 50° C. it begins to turn yellow. The temperature is raised to 100° C. and held at 100° C. for one hour. The pigment is then removed by filtering hot, the filter cake washed with glacial acetic acid, the acid removed by washing with acetone and the product dried.

Yield=6.1 g., 92% of theory. The product has the same formula as that of Example 2.

EXAMPLE 4

Preparation of pigment from 1,1'-diphenyl-3,3'-(m-phenylene)-5,5'-dipyrazolone

In a 100 cc. 3-necked flask fitted with thermometer, stirrer and reflux condenser is charged 30 cc. glacial acetic acid, 6.6 g. bis pyrazolone (M.W. 394) from diethyl isophthaloyl diacetate and phenylhydrazine, and 2.8 cc. (2.46 g.) ethyl orthoformate. The mixture is heated to and held at 100° C. for 1½ hours, filtered hot and the filter cake washed free of acetic acid with acetone and dried.

Yield=5.8 g.

Percent of theory=87% based on the formula for the product (M.W. 798).

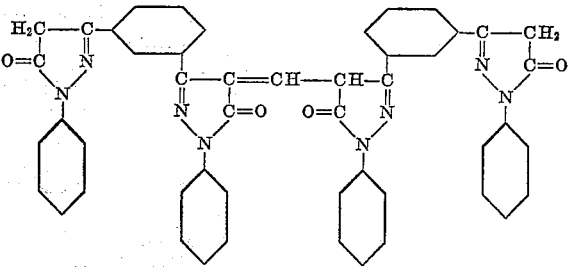

The product is an insoluble yellow pigment of good fastness properties.

EXAMPLE 5

Preparation of pigment from 1,1'-di-(2-naphthyl)-3,3'-(p-phenylene)-5,5'-dipyrazolone In a 100 cc. 3-necked flask fitted with thermometer, stirrer and reflux condenser is charged 63 cc. formamide and 7.0 g. bis pyrazolone (M.W. 494) from diethyl terephthaloyl diacetate and 2-naphthyl hydrazine. The mixture is heated with stirring to 137° C. during 23 min. and held at 137 to 140° C. for 3 hours 22 min. All the bis pyrazolone is in solution at the end of this period with no precipitate of pigment. The temperature of the mixture is raised to 190° C. in 15 minutes. A precipitate of yellow pigment begins to form rapidly. The temperature is further raised to 200° C. in 5 min. and the reflux condenser removed to allow water to escape for 5 to 10 minutes. The condenser is replaced and the mixture heated at 196 to 200° C. for 2 hours. The mixture is then filtered after cooling to 100° C., washed 3 times with 200 cc. hot formamide and then washed free of formamide with water.

The product has the formula (M.W. 998):

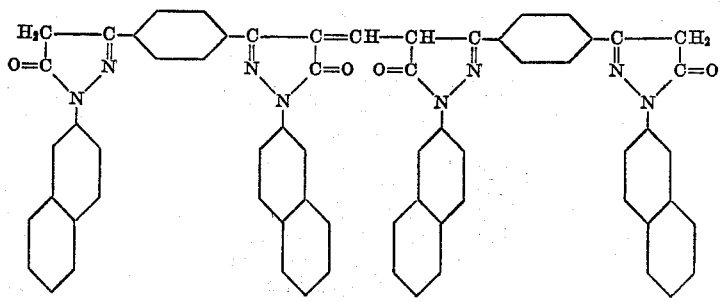

The product is an insoluble yellow pigment of good fastness properties, including fastness to over-striping.

EXAMPLE 6

*Preparation of pigment from 1,1'-di-(p-bromophenyl)- 3,3'-(p-phenylene)-5,5'-dipyrazolone*

In a 200 cc. 3-necked flask suitably fitted is charged 90 cc. formamide and 10 g. bis pyrazolone from diethyl terephthaloyl diacetate and p-bromophenyl hydrazine. The mixture is heated with stirring under a reflux condenser to 135° C. in 35 minutes and held at 135 to 140° C. for 1 hour and 50 minutes. Only a small amount of deep yellow pigment has separated at the end of this time, so the temperature of the reaction mixture is raised to 180° C. within 15 minutes and held at 180 to 190° C. for 1 hour, 40 minutes. The pigment is removed by filtration at 150° C. and washed with 25 cc. hot formamide, then after cooling somewhat, with 150 cc. methanol 4 times and finally dried in the hot box.

Yield=8.6 g.

Percent of theoretical=85%, based on the formula for the product (M.W. 1014):

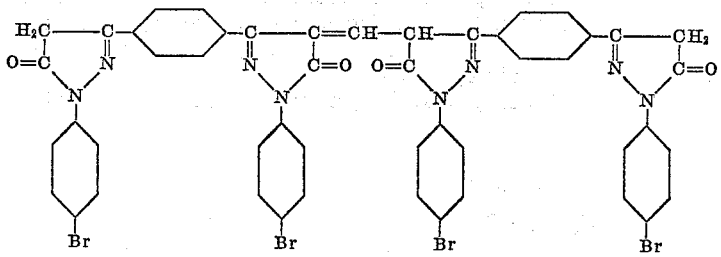

The product is an insoluble yellow pigment having good fastness properties, including fastness to bleed on overstripe. The light test shows a slight break on the fadometer at 100 hours.

EXAMPLE 7

The bis pyrazolone compound from Example 1 is purified by recrystallization from dichlorobenzene, and the resulting purified bis pyrazolone reacted with formamide in a manner similar to that of Example 2 by heating at 180 to 190° C. for 1½ hours to produce a pigment of the same formula as that of Examples 2 and 3.

Yield is 85% of theory.

The product is brighter and stronger than the products of Examples 2 and 3.

EXAMPLE 8

The procedure of Example 7 is repeated except that the bis pyrazolone is first recrystallized from trichlorobenzene instead of dichlorobenzene.

The yield is 81% of theory.

The resulting pigment is brighter and stronger than that of Example 7.

EXAMPLE 9

The pigment of Example 2 is subjected to the action of chlorine, the resulting product analyzing 16.1% chlorine. Theoretical for one chlorine atom in each N-phenyl group is 15.1% showing the product to be substantially mono-chlorinated. The product has good fastness properties, including fastness to bleed on overstripe.

EXAMPLE 10

*Aftertreatment of pigment*

In an open beaker provided with stirrer and thermometer, 10 g. pigment from Example 2 is dissolved by stirring below 30° C. with 100 cc. (184 g.) concentrated sulfuric acid. All is dissolved after 30 minutes; after 30 minutes additional stirring a precipitate of the sulfate begins to form. The mixture is stirred 3 hours longer and then allowed to stand overnight. The dark orange crystalline sulfate is removed by filtration and washed with 25 cc. concentrated sulfuric acid. The cake is then slurried with 500 cc. distilled water and ice. The sulfate hydrolyzes instantly to a very bright and clean free pigment, which is removed by filtering and then washed free of acid, dried and weighed.

Yield=7.7 g.

The product is brighter, stronger and more light fast than the products of Examples 2, 3, 7, 8 and 9. The filtrate on dilution with water yields 2.2 g. of a dull yellow brown pigment.

EXAMPLE 11

A flask equipped with a cooling bath, a thermometer, an agitator and a calcium chloride tube to prevent atmospheric moisture from entering is charged with:

900 parts by volume concentrated sulfuric acid (96%).

Under cooling below 18° C. there is added gradually during 8 minutes: 100 parts by weight of the pigment from Example 2. The charge is stirred for one hour to dissolve the pigment. Then under cooling below 25° C. 364 parts by volume of 77.7% $H_2SO_4$ (gr. 1.706=622 parts by weight) is added gradually under agitation during 45 minutes, lowering the acidity to 91% $H_2SO_4$. The charge is then agitated for 2 hours and 15 minutes. The precipitate is filtered off on a glass sinter funnel and washed with 150 parts by volume 91% $H_2SO_4$. Then the cake is introduced into 2500 parts by ice and water, stirred for ½ hour, filtered, washed neutral and dried. There is obtained 79.5 parts by weight of a yellow pigment which is even stronger and brighter than the product of Example 10.

This invention has been disclosed with respect to certain preferred embodiments, and there will become obvious to persons skilled in the art various modifications, equivalents or variations thereof which are intended to be included within the spirit and scope of this invention.

I claim:

1. A compound having the formula

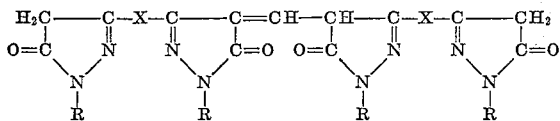

wherein X is selected from the group consisting of phenylene, naphthylene, and biphenylene; and R is selected from the group consisting of H, lower alkyl, benzyl, phenyl, napthyl, biphenyl and the halo, nitro and lower alkyl substituted derivatives thereof.

2. The compound of the formula

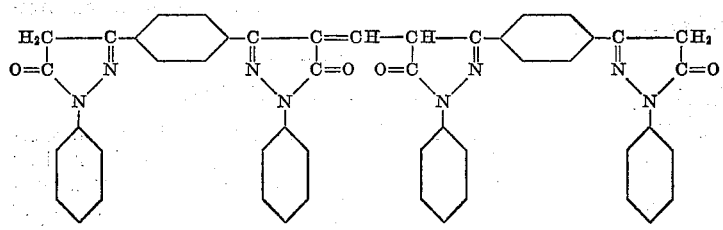

3. The compound of the formula

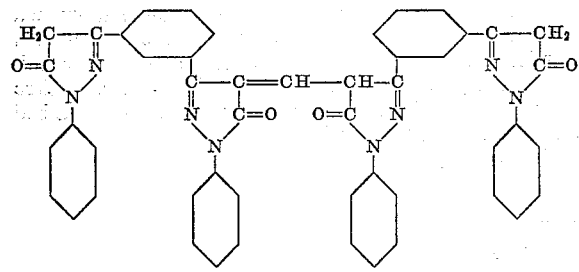

4. A compound of the formula

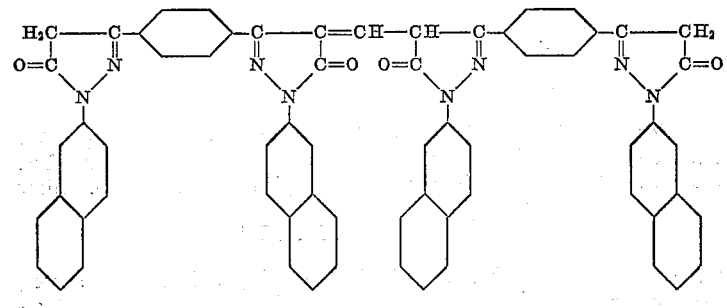

5. A compound of the formula

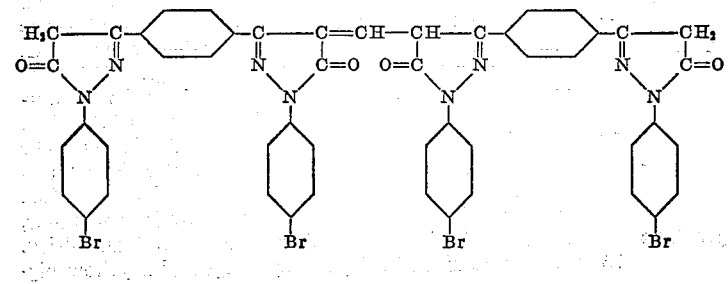

6. A process for producing a compound as defined in claim 1 comprising reacting by heating 2 moles of a bis pyrazolone having the formula

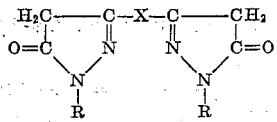

wherein X is selected from the group consisting of phenylene, napthylene and biphenylene; and R is selected from the group consisting of H, lower alkyl benzyl, phenyl, naphthyl, biphenyl and the halo, nitro and lower alkyl substituted derivatives thereof, with 1 mole of a methylidyne donor linking agent selected from the group consisting of chloroform, dialkoxymethyl, carboxylates, orthoformic acid esters, and formamide.

7. A process as defined in claim 6 wherein said agent is ethylorthoformate.

8. A process as defined in claim 6 wherein said agent is formamide.

9. A process for producing a compound as defined in claim 2 comprising reacting by heating 2 moles of 1,1'-diphenyl-3,3'-(p-phenylene)-5,5'-dipyrazolone with 1 mole of formamide.

10. A process for producing a compound as defined in claim 2 comprising reacting by heating 2 moles of 1,1'-diphenyl-3,3'-(p-phenylene)-5,5'-dipyrazolone with 1 mole of ethylorthoformate.

11. A process for producing a compound as defined in claim 3 comprising reacting by heating 2 moles of 1,1'-diphenyl-3,3'-(m-phenylene)-5,5'-dipyrazolone with 1 mole of ethylorthoformate.

12. A process for producing a compound as defined in claim 4 comprising reacting by heating 2 moles of 1,1' - di - (2 - naphthyl) - 3,3' - (p - phenylene) - 5,5'-dipyrazolone with one mole of formamide.

13. A process for producing a compound as defined in claim 5 comprising reacting by heating 2 moles of 1,1' - di - (p - bromophenyl) - 3,3' - (p - phenylene)-5,5'-dipyrazolone with one more of formamide.

14. A process as defined in claim 6 followed by purification of the resulting compound by dissolving same in concentrated sulfuric acid and hydrolyzing the resulting sulfate ester of said compound by treatment with water.

References Cited in the file of this patent

UNITED STATES PATENTS 2,533,206 Dent _____ Dec. 12, 1950

OTHER REFERENCES

Ridi et al.: Gazz. Chim. Ital., vol. 83, pp. 36–43 (1953).

Venkataraman: Synthetic Dyes, vol. II, p. 1150, Academic Press, Inc., 1952.

UNITED STATES PATENT OFFICE
CERTIFICATION OF CORRECTION

Patent No. 2,903,452　　　　　　　　　　September 8, 1959

Carl Mayn Smith

It is hereby certified that error appears in the above numbered patent requiring correction and that the said Letters Patent should read as corrected below.

Column 6, line 73, after "by" insert -- weight --; column 9, line 6, for "more" read -- mole --.

Signed and sealed this 30th day of May 1961.

(SEAL)
Attest:

ERNEST W. SWIDER
Attesting Officer

DAVID L. LADD
Commissioner of Patents